US010569725B2

(12) United States Patent
Ogawa et al.

(10) Patent No.: US 10,569,725 B2
(45) Date of Patent: Feb. 25, 2020

(54) GROMMET

(71) Applicant: Yazaki Corporation, Tokyo (JP)

(72) Inventors: Masayoshi Ogawa, Toyota (JP);
Satoshi Yokoyama, Toyota (JP);
Shinichi Ikeda, Toyota (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/115,706

(22) Filed: Aug. 29, 2018

(65) Prior Publication Data
US 2019/0111869 A1    Apr. 18, 2019

(30) Foreign Application Priority Data
Oct. 13, 2017    (JP) .................................. 2017-199458

(51) Int. Cl.
*H02G 3/22*    (2006.01)
*B60R 16/02*    (2006.01)
*H02G 3/04*    (2006.01)
*H02G 3/06*    (2006.01)

(52) U.S. Cl.
CPC ....... *B60R 16/0222* (2013.01); *H02G 3/0468* (2013.01); *H02G 3/0691* (2013.01); *H02G 3/22* (2013.01)

(58) Field of Classification Search
CPC .......... H02G 3/04; H02G 3/0468; H02G 3/22; H02G 3/30; H02G 3/36; H02G 3/0406; H02G 3/24; H02G 3/26; B60R 16/02; B60R 16/0222; B60R 16/0207; B60R 16/0215; H01B 17/58; H01B 17/583; H01B 17/586; F16L 5/02; F16L 5/00
USPC .... 174/650, 152 R, 152 G, 153 G, 135, 142, 174/137 R, 151, 17 CT, 138 R; 439/587, 439/271, 272, 273, 274, 275; 16/2.1, 2.2; 248/56
See application file for complete search history.

(56) References Cited

U.S. PATENT DOCUMENTS

| 4,928,349 | A | * | 5/1990 | Oikawa | .................. | H02G 3/083 |
| | | | | | | 174/153 G |
| 4,945,193 | A | * | 7/1990 | Oikawa | ................ | H02G 3/0625 |
| | | | | | | 174/153 G |
| 5,300,734 | A | * | 4/1994 | Suzuki | .................. | H01R 13/56 |
| | | | | | | 174/135 |
| 6,901,627 | B2 | * | 6/2005 | Uchida | ............... | B60R 16/0222 |
| | | | | | | 174/135 |

(Continued)

FOREIGN PATENT DOCUMENTS

| JP | 2014-033564 A | 2/2014 |
| JP | 2014138519 A | 7/2014 |
| JP | 2015198557 A | 11/2015 |

*Primary Examiner* — Angel R Estrada
(74) *Attorney, Agent, or Firm* — Sughrue Mion, PLLC

(57) ABSTRACT

A grommet which can maintain water tightness in response to inclination is provided. In an attachment section of the grommet, a substantially right-angled first bending portion is formed between a first flange portion and a tubular portion. Thus, when the attachment section is inclined with respect to a panel member, the first bending portion changes in angle, thereby absorbing the inclination, and thereby maintaining the contact between the annular lip portion and a planar portion. As a result, water tightness can be maintained in response to the inclination.

4 Claims, 6 Drawing Sheets

(56) References Cited

U.S. PATENT DOCUMENTS

| | | | |
|---|---|---|---|
| 7,020,931 B1* | 4/2006 | Burnett | B60R 16/0222 |
| | | | 174/153 G |
| 8,816,210 B2* | 8/2014 | Yoshimura | B60R 16/0222 |
| | | | 174/153 G |
| 8,975,524 B2* | 3/2015 | Kanai (Popovici) | ........................ |
| | | | B60R 16/0222 |
| | | | 174/153 G |
| 2014/0196931 A1 | 7/2014 | Fujita et al. | |
| 2015/0144378 A1* | 5/2015 | Asayama | B60R 16/0222 |
| | | | 174/152 G |

\* cited by examiner

US 10,569,725 B2

GROMMET

CROSS REFERENCE TO RELATED APPLICATION

The priority application Japanese Patent Application No. 2017-199458 upon which this patent application is based is hereby incorporated by reference.

FIELD OF THE INVENTION

The present invention relates to a grommet configured to be attached to an attachment hole of a panel member.

BACKGROUND OF THE INVENTION

When mounting an electric wire to a vehicle door and such to feed electric power, a grommet may be used to protect the electric wire from water. For a vehicle with a sprung type back door, for example, one end of the grommet covering the electric wire may be attached to a vehicle body-side panel member, while the other end of the grommet may be attached to a door-side panel member, in the vicinity of a hinged portion of the back door.

In a known example of such grommet, a flange portion that faces the panel member and an annular lip portion that contacts with an opening edge (planar portion) of the attachment hole, are arranged to abut each other, as described in Japanese Patent Application Publication No. 2014-33564 (hereinafter called "JP'564"). In the grommet described in JP'564, the annular lip portion and the flange portion abut each other, and the annular lip portion is sandwiched between the flange portion and the panel member, thereby making the annular lip portion pushed hardly against the opening edge.

SUMMARY OF THE INVENTION

Application of an external force onto the grommet when opening or closing the door may cause the grommet to be inclined with respect to the panel member. With the grommet described in JP'564, it is often difficult to maintain the water tightness when such inclination occurs in the grommet.

An object of the present invention is to provide a grommet which can maintain the water tightness in response to the inclination of the grommet.

The present invention provides a grommet formed into a tubular shape so as to cover an electric wire and configured to be attached to an attachment hole of a panel member, the grommet includes: a first flange portion configured to face the panel member; and an annular lip portion extending from an inner peripheral part of the first flange portion toward the panel member so as to elastically contact with a planar portion around the attachment hole, wherein the annular lip portion includes a tubular portion extending in an extending direction corresponding to a direction perpendicular to a surface of the panel member, and wherein a substantially right-angled bending portion is formed between the first flange portion and the tubular portion.

According to the grommet of the present invention described above, the substantially right-angled bending portion is formed between the first flange portion and the tubular portion. Thus, when the grommet is inclined with respect to the panel member, the angle of the bending portion changes, thereby absorbing the inclination. Consequently, the tubular portion itself is unlikely to be deformed, and thus the contact between the annular lip portion and the planar portion can be maintained. Thus, the water tightness can be maintained in response to the inclination.

DETAILED DESCRIPTION OF EXEMPLARY EMBODIMENT OF THE INVENTION

Figure 1:
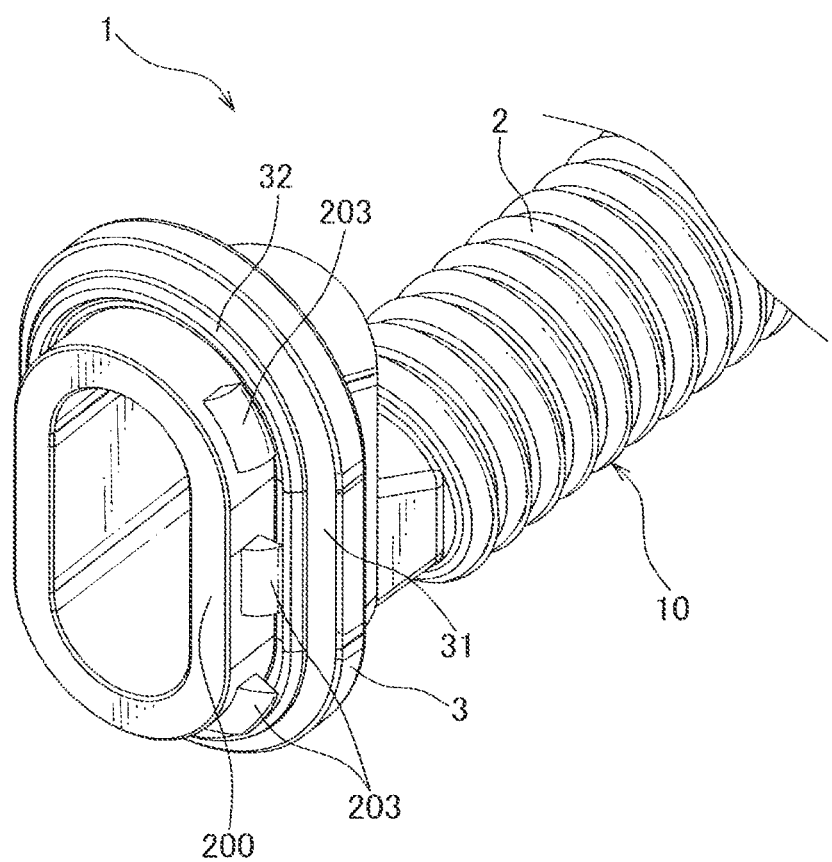
FIG. 1 is a perspective view of a grommet according to an embodiment of the present invention.
Figure 2:
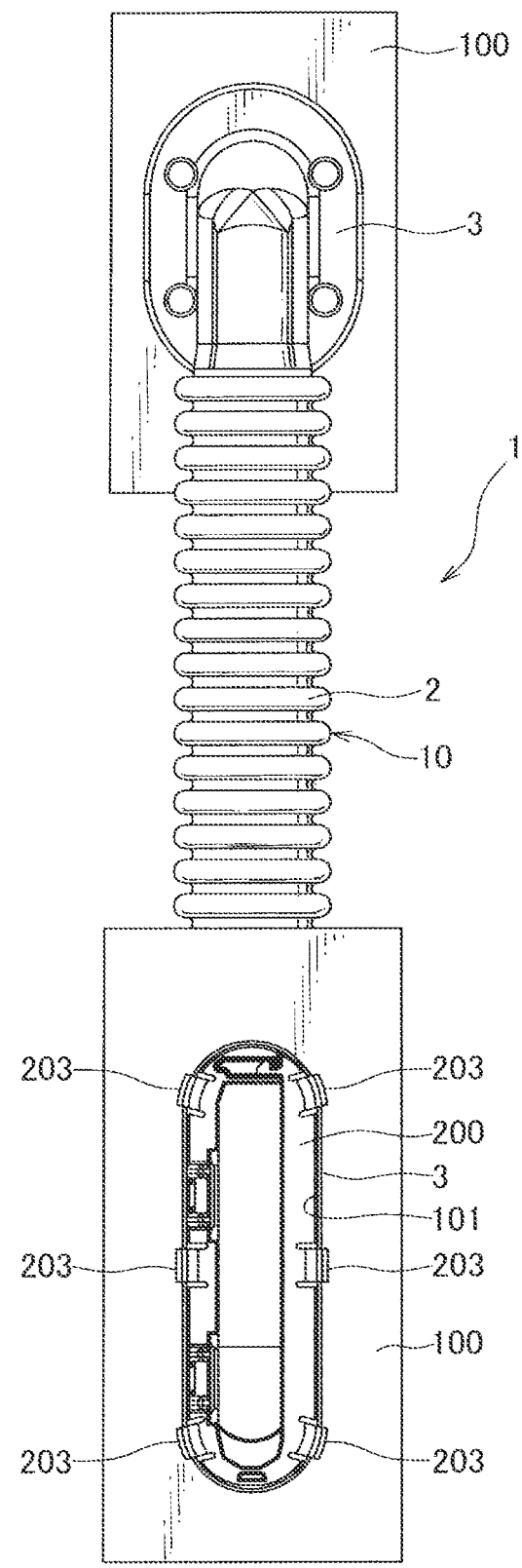
FIG. 2 is a plan view of the grommet.
Figure 3:
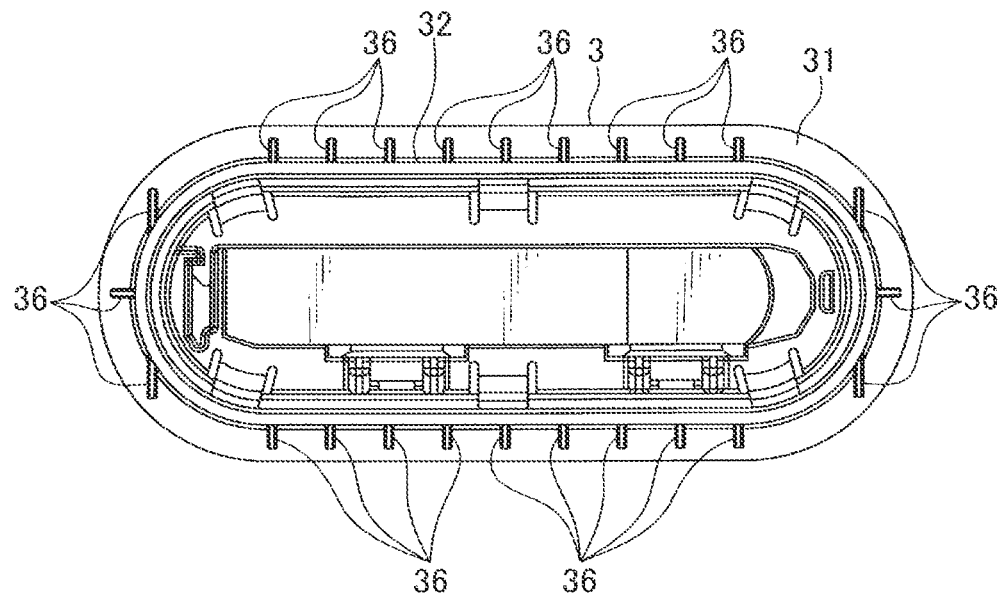
FIG. 3 is a plan view of an attachment section of the grommet.
Figure 4:
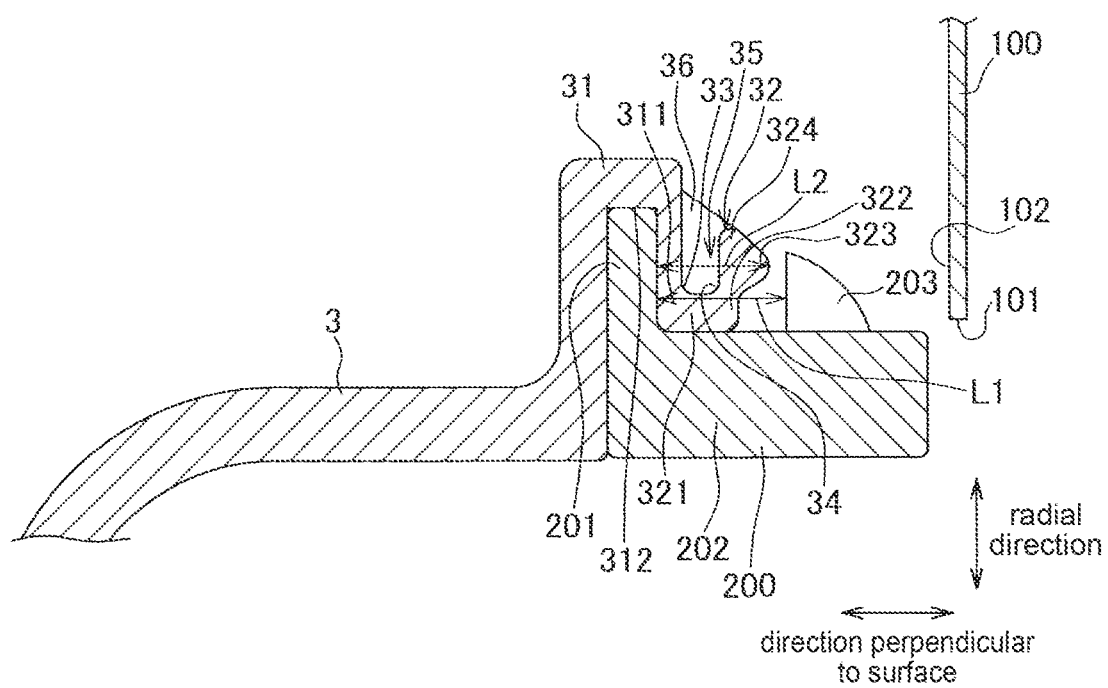
FIG. 4 is a cross-sectional view of a portion of the grommet.
Figure 5:
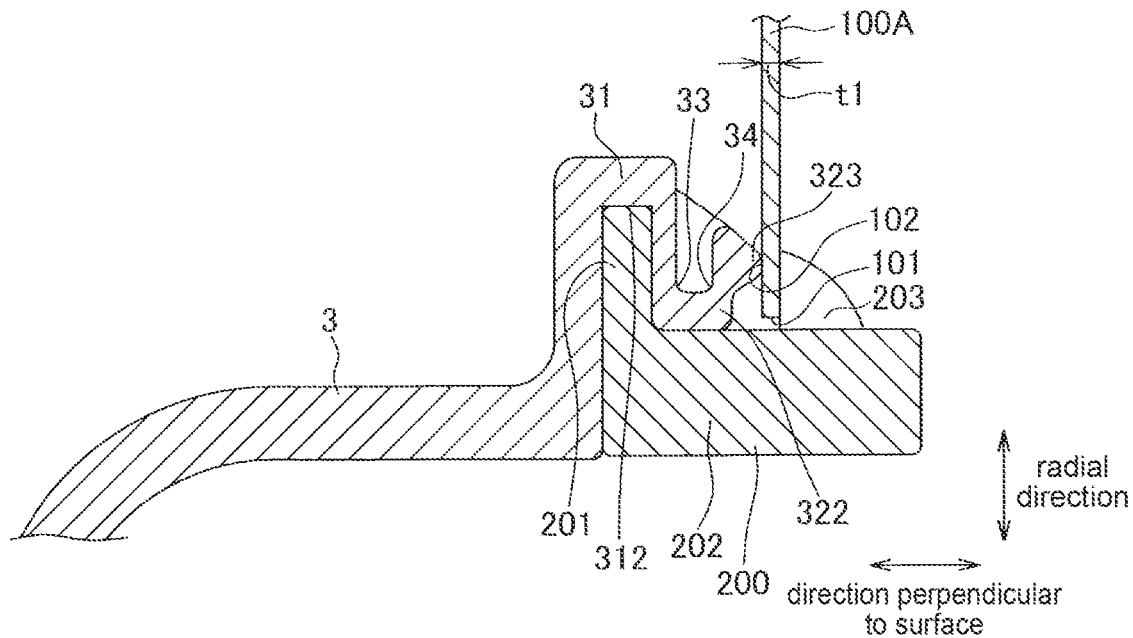
FIG. 5 is a cross-sectional view of the grommet attached to a panel member.
Figure 6:
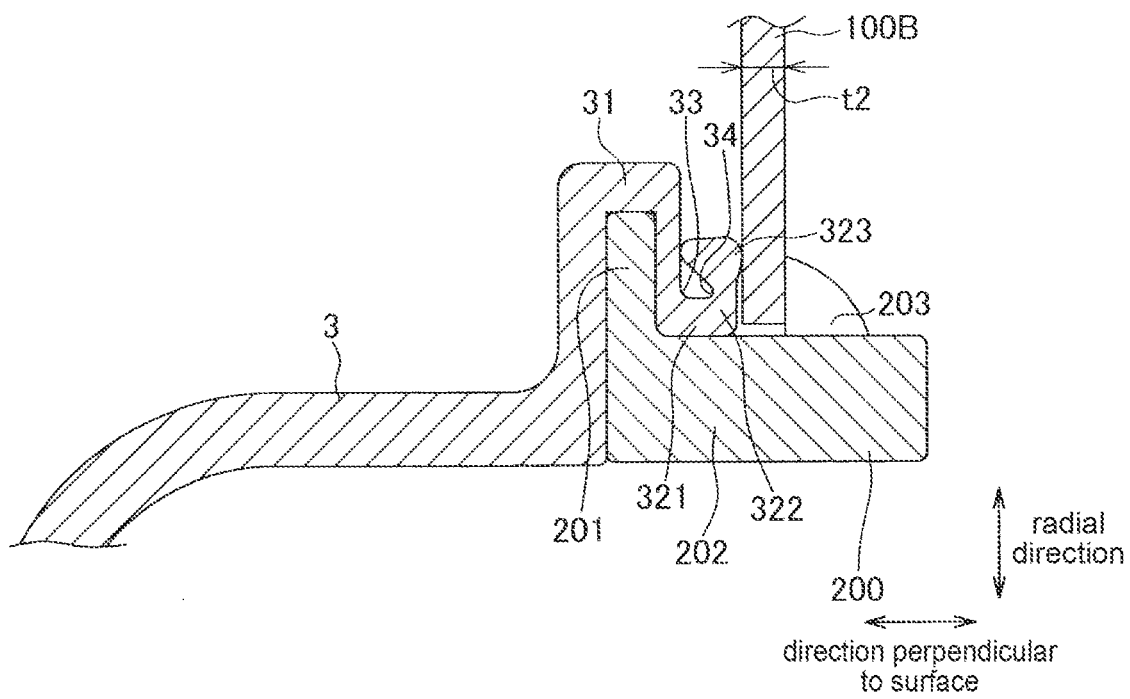
FIG. 6 is a cross-sectional view of the grommet attached to another panel member.
Figure 7:
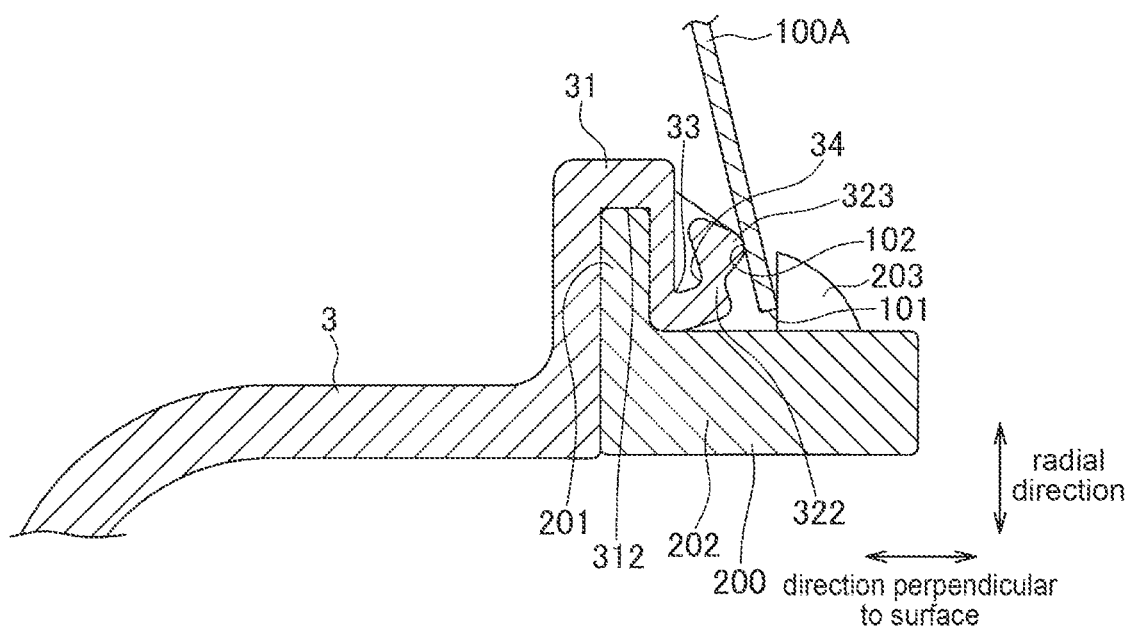
FIG. 7 is a cross-sectional view of the grommet being inclined with respect to the panel member.
Figure 8:
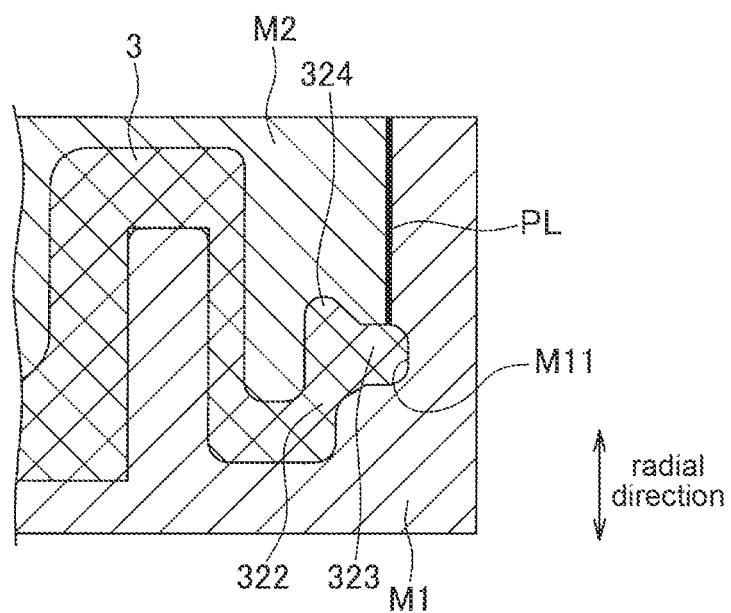
FIG. 8 is a cross-sectional view of dies used to mold the attachment section.

An embodiment of the present invention is hereinafter described in reference with the drawings. FIG. 1 is a perspective view of a grommet 1 according to the embodiment of the present invention. FIG. 2 is a plan view of the grommet 1. FIG. 3 is a plan view of an attachment section 3 of the grommet 1. FIG. 4 is a cross-sectional view of a portion of the grommet 1. FIG. 5 is a cross-sectional view of the grommet 1 attached to a panel member 100A. FIG. 6 is a cross-sectional view of the grommet 1 attached to another panel member 100B. FIG. 7 is a cross-sectional view of the grommet 1 being inclined with respect to the panel member 100A. FIG. 8 is a cross-sectional view of dies used to mold the attachment section 3.

As illustrated in FIGS. 1 to 3, the grommet 1 according to this embodiment is formed into a tubular shape so as to cover an electric wire and is configured to be attached to an attachment hole 101 of a panel member 100. The grommet 1 is configured to be mounted to a vehicle with a sprung type back door in the vicinity of a hinged portion of the back door, for example. The grommet 1 includes a grommet body 10 and an inner member 200. The grommet body 10 includes a corrugated tube portion 2 through which an electric wire is to be inserted, and attachment sections 3 to be attached to the panel member. The corrugated tube portion 2 and the attachment sections 3 are made of a soft resin and are formed integral with one another. The attachment sections 3 are formed at both ends of the corrugated tube portion 2 and are configured to be attached for example to a vehicle-side panel member and a door-side panel member, respectively. In this embodiment, the two attachment sections 3 are similar in constitution.

The corrugated tube portion 2 are formed into bellows and is bendable, extendable and shrinkable. Thus, the corrugated tube portion 2 is deformed accordingly in accordance with the opening and closing of the back door.

The attachment section 3 has a tubular shape with an opening on a side closer to the panel member 100, and has an oval shape in a view from the side of the panel member 100. As illustrated in FIG. 4, the attachment section 3 has, on its opening side, a first flange portion 31 configured to face the panel member 100, and an annular lip portion 32 continuous with an inner peripheral part 311 of the first flange portion 31 and extending toward the panel member 100.

The first flange portion 31 is a portion with a diameter greater than other parts of the attachment section 3, and is formed into a flange shape that follows the panel member 100. A concave shaped inner member housing 312 is formed on an inner-diameter side of the first flange portion 31. The inner member housing 312 is configured to house a later-described flange portion 201 of the inner member 200.

The inner member 200 is disposed on the radially inner side of the attachment section 3 of the grommet 1, and is configured to pass an electric wire therethrough. The inner member 200 is made of a resin having a higher degree of hardness than the material of the grommet 1. The inner member 200 has a flange portion 201, a tubular portion 202, and engaging portions 203, which are arranged in this order in a direction from the grommet 1 toward the panel member 100.

The flange portion 201 is greater in diameter than the attachment hole 101 and is configured to face the panel member 100. By housing the flange portion 201 in the inner member housing 312, the inner member 200 is attached to the attachment section 3. The tubular portion 202 has a diameter smaller than that of the attachment hole 101 so as to be insertable in the attachment hole 101. The engaging portions 203 are each inclined so as to reduce its diameter toward its tip end side, while the outermost diameter of the engaging portions 203 is greater than the inner diameter of the attachment hole 101. Thus, by inserting the engaging portions 203 in the attachment hole 101, the engaging portions 203 are engaged with an inner surface of the panel member 100 (i.e., a surface on the opposite side of the grommet body 10).

As described above, the grommet 1 includes the inner member 200 by which the grommet 1 is attached to the panel member 100. Further, a portion of the grommet body 10 and a portion of the panel member 100 around the attachment hole 101 are sandwiched between the flange portion 201 and the engaging portions 203.

The annular lip portion 32 elastically contacts the planar portion 102 of the panel 100 around the attachment hole 101 to ensure water tightness. The annular lip portion 32 has a tubular portion 321 continuous with the inner peripheral part 311 of the first flange portion 31, a second flange portion 322 continuous with a tip end of the tubular portion 321, and a protruding portion 323 protruding from the second flange portion 322.

The tubular portion 321 is formed into a tubular shape extending along an extending direction corresponding to a direction perpendicular to the surface of the panel member 100. The second flange portion 322 is extending radially outward from the tubular portion 321 and is extending substantially parallel to the panel member 100. The protruding portion 323 is protruding toward the planar portion 102. The second flange portion 322 is provide with a flange protrusion 324 protruding more radially outward than the protruding portion 323.

The first flange portion 31 is extending substantially parallel to the panel member 100, while the tubular portion 321 is extending substantially perpendicularly with respect to the panel member 100. Accordingly, a substantially right-angled first bending portion 33 is formed between first flange portion 31 and the tubular portion 321. The tubular portion 321 is extending substantially perpendicularly with respect to the panel member 100, while the second flange portion 322 is extending substantially parallel to the panel member 100. Accordingly, a substantially right-angled second bending portion 34 is formed between the tubular portion 321 and the second flange portion 322.

In the attachment section 3, the first flange portion 31, tubular portion 321 and second flange portion 322 together form an outer-side concave portion 35 having a concave outer surface. The second flange portion 322 has a radial dimension smaller than the depth of the inner member housing 312 of the first flange portion 31. Thus, the tip end of the protruding portion 323 (i.e., a portion that contacts with the planar portion 102) is located more radially inward than the bottom portion of the inner member housing 312. A radially outer edge of the flange portion 201 of the inner member 200 is configured to abut on the bottom portion of the inner member housing 312, such that the tip end of the protruding portion 323 overlaps with the flange portion 201 in a view along the direction perpendicular to the surface of the panel member 100. The protruding portion 323 is restricted from moving radially outward as described later, thus the annular lip portion 32 abuts the planar portion 102 at a location more radially inward than the outer peripheral edge of the flange portion 201.

The attachment section 3 has a plurality of ribs 36 that interconnect the annular lip portion 32 and the first flange portion 31. The ribs 36 are spaced at predetermined intervals along the opening of the attachment section 3. The ribs 36 are extending slantwise from a radially outer end of the second flange portion 322 and are directed more radially outward and connected to the first flange portion 31. As described later, when the annular lip portion 32 are deformed, the ribs 36 are also deformed.

In the following, the deformation of the annular lip portion 32 during the attachment of the grommet 1 to the panel member 100 is described. First, referring to FIG. 4, the case of the use of a panel member 100A is described. The panel member 100A is configured such that the sum of a dimension L2, which is a dimension of the attachment section 3 between the flange portion 201 and the engaging portion 203, and a thickness t1, which is the thickness of the panel member, is slightly greater than an interval L1 between the flange portion 201 and the engaging portion 203 in the direction perpendicular to the surface of the panel member. When the engaging portions 203 are engaged with the panel member 100A, the tip end of the protruding portion 323 of the annular lip portion 32 abuts on the planar portion 102, with the attachment section 3 being barely deformed.

Next, referring to FIG. 5, the case of the use of a panel member 100B is described. The panel member 100B is configured such that the sum of the dimension L2 and a thickness t2 of this panel member is even more greater than the interval L1. When the engaging portions 203 are engaged with the panel member 100B, the tip end of the protruding portion 323 of the annular lip portion 32 abuts on the planar portion 102. At this time, the attachment section 3 is deformed, because the respective elements have the dimensional relationship as described above and the material of the grommet 1 is softer than the panel member 100B and the inner member 200.

Specifically, as the second flange portion 322 is moved toward the first flange portion 31, the second bending portion 34 is bent and thereby acutely angled. At this time, the outer-side concave portion 35 provides a space for the movement of the second flange portion 322. Such deformation causes the protruding portion 323 to move along an arc centered on the second bending portion 34, i.e., the protruding portion 323 is thereby moved toward the first flange portion 31 in a direction perpendicular to the surface of the panel member and is also moved radially inward. Then, the protruding portion 323 of the annular lip portion 32 abuts on the planar portion 102, as with the case illustrated in FIG. 4.

As described above, when the annular lip portion 32 elastically contacts the planar portion 102 of the panel member 100 and thereby deforms, the protruding portion 323 abutting the planar portion 102 mainly moves in a direction perpendicular to the surface of the panel member, but does not move in the radially outward direction. That is, since the annular lip portion 32 is extending in entirety in a direction perpendicular to the surface of the panel member 100, when the annular lip portion 32 elastically contacts the planar portion 102, the annular lip portion 32 is compressed and deformed in the direction perpendicular to the surface of the panel member. At this time, the protruding portion 323 moves radially inward. Since the protruding portion 323 is formed into a curved face, the contact state shifts from the state in which the tip end of the protruding portion 323 is in contact with the planar portion 102 to the state in which a portion of the protruding portion 323 located radially inward than the tip end is in contact with the planar portion 102, in association with the above-mentioned deformation. At this time, the point of contact of the planar portion 102 with the protruding portion 323 remains substantially constant, and at least the protruding portion 323 is not moved radially outward (i.e., the point of contact does not move radially outward).

Next, the following will describe about the case when an external force is applied to the attachment section 3 and the attachment section 3 is inclined while the attachment section 3 is attached to the panel member 100. FIG. 5 illustrates the state without the inclination, and FIG. 7 illustrates the state in which the inclination is produced.

When the attachment section 3 is inclined, the first flange portion 31 moves toward the panel member 100, and the first bending portion 33 is bent so as to form an acute angle. By allowing the first bending portion 33 to bend, the second bending portion 34 is unlikely to bend. That is, the second flange portion 322 is unlikely to be deformed, and the protruding portion 323 protruding from the second flange portion 322 is unlikely to move. Thus, the point of contact between the protruding portion 323 and the planar portion 102 is unlikely to be displaced. On the opposite side, the first flange portion 31 moves away from the panel member 100, and the first bending portion 33 is bent so as to form an obtuse angle. In this case also, the protruding portion 323 is unlikely to move, and the point of contact between the protruding portion 323 and the planar portion 102 is unlikely to be displaced.

Next, the following will explain dies used to mold the attachment section 3 with reference to FIG. 8. The attachment section 3 is molded using a pair of dies M1 and M2. One of the dies M1 is formed with a protrusion-forming recess M11 to form the protruding portion 323. A parting line PL between the dies M1 and M2 is extending straight in the radially outward direction from a portion of the protrusion-forming recess M11 located closer to the first flange portion 31 than the tip end.

The cavity formed by the dies M1 and M2 is filled with resin, and after the resin is cured, the die M2 is moved radially outward to open the dies. Then, an operator holds the flange protrusion 324 of the second flange portion 322 with his/her fingers or nips the flange protrusion 324 with a jig and removes the attachment section 3 out of the die M1.

The embodiment of the present invention described above provides the following advantageous effects. In the attachment section 3, the substantially right-angled first bending portion 33 is formed between the first flange portion 31 and the tubular portion 321. Thus, when the attachment section 3 is inclined with respect to the panel member 100, the angle of the first bending portion 33 is changed, thereby absorbing the inclination. As a result, the tubular portion 321 itself is unlikely to be deformed, and thus the contact between the protruding portion 323 and the planar portion 102 can be maintained. Consequently, the water tightness can be maintained in response to the inclination.

Furthermore, as described above, the annular lip portion 32 has the second flange portion 322 and the protruding portion 323, the substantially right-angled second bending portion 34 is formed, thereby forming the outer-side recessed portion 35 with the first flange portion 31, tubular portion 321 and second flange portion 322. Thus, the second bending portion 34 can be deformed such that the protruding portion 323 is moved closer to the first flange portion 31. Thus, the second bending portion 34 is allowed to be deformed according to the thickness of the panel member 100, and the attachment section 3 can be attached to the panel member 100.

Furthermore, in order to correspond to the panel member 100 with various plate thicknesses, the protrusion height of the protruding portion 323 may be adjusted. The size adjustment is easier compared with the known art using an annular lip portion extending slantwise in the radially outward direction.

Further, since the flange protrusion 324 is formed on the second flange portion 322, the attachment section 3 can be easily removed out from the die M1 after the attachment section 3 is molded by the dies M1, M2 and the dies are opened.

The present invention includes but is not limited by the embodiment described herein. The scope of the present invention may further encompass other technical aspects, including modifications described below.

For example, in the embodiment described above, the second flange portion 322 is formed with the flange protrusion 324. However, the flange protrusion may not be formed on the second flange portion. In this case, when removing the attachment section from the die, an operator can hold or nip other protrusion of the first flange portion with his/her fingers or a jig.

Figure 9:
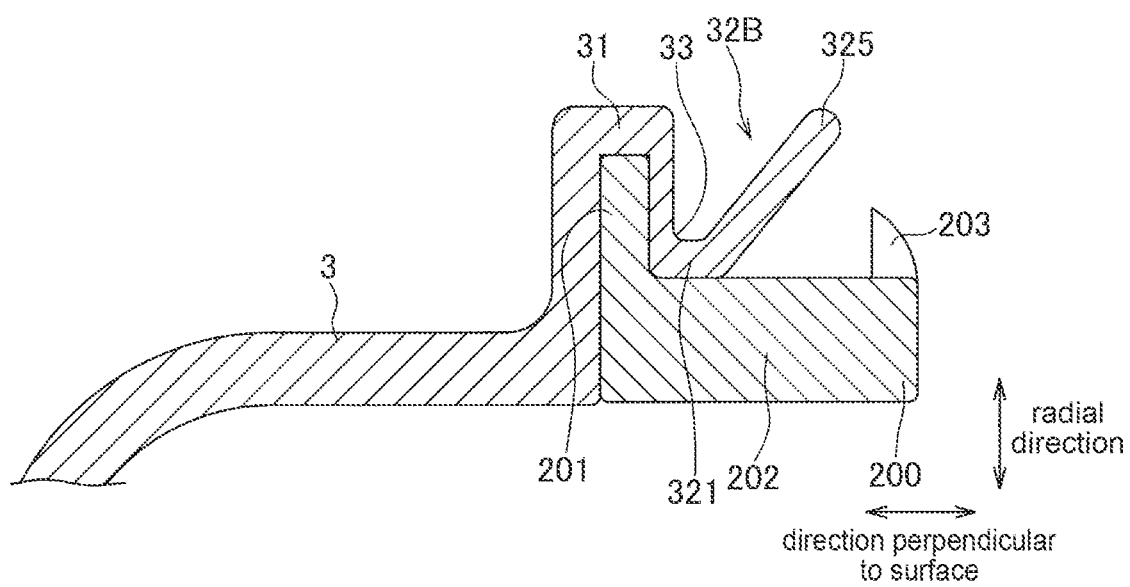
FIG. 9 is a cross-sectional view of a portion of a grommet according to a modified embodiment of the present invention.

Further, in the embodiment described above, the annular lip portion 32 includes the second flange portion 322 and the protruding portion 323. However, the annular lip portion may have at least the tubular portion with a substantially right-angled bending portion formed between the first flange portion and the tubular portion. For example, as shown in FIG. 9, an annular lip portion 32B may include a tubular portion 321 and an abutting portion 325 continuous with a tip end of the tubular portion 321 and extending slantwise in the radially outward direction. In this case also, the substantially right-angled first bending portion 33 is formed, so that when the attachment section 3 is inclined with respect to the panel member 100 the inclination can be absorbed, as with the embodiment described above.

The present invention is not limited to the technical means and features described thus far and may include any other possible technical aspects within the scope of the present invention. The embodiment of the present invention was described herein by way of example in all aspects and should not be construed as limiting the scope of the present invention. The scope of the present invention is intended to include various modifications made by those skilled in the art concerning shapes, materials, quantities, and any other specifics without departing from the technical idea and spirit of the present invention. Any shapes, materials, and/or specifics described herein are not intended to limit the scope of the present invention but are only illustrated by way of example, so that the present invention is better and more clearly understood. The scope of the present invention includes all of the structural elements and their names described herein with or without limitations, in whole or in part, on materials, shapes, and so forth.

REFERENCE SIGNS LIST 1 grommet
31 flange portion
32 annular lip portion
321 tubular portion
322 second flange portion
323 protruding portion
324 flange protrusion
33 first bending portion
34 second bending portion
100 panel member
101 attachment hole
102 planar portion

What is claimed is:

1. A grommet formed into a tubular shape so as to cover an electric wire and configured to be attached to an attachment hole of a panel member, the grommet comprising:
    a first flange portion configured to face the panel member; and
    an annular lip portion extending from an inner peripheral part of the first flange portion toward the panel member so as to elastically contact with a planar portion around the attachment hole,
    wherein the annular lip portion includes a tubular portion extending in an extending direction corresponding to a direction perpendicular to a surface of the panel member, and
    wherein a substantially right-angled bending portion exists between an outer periphery of the first flange portion and an outer periphery of the tubular portion in a state where the grommet is not attached to the attachment hole.

2. The grommet according to claim 1, wherein the annular lip portion comprises:
    a second flange portion continuous with a tip end of the tubular portion and extending radially outward; and
    a protruding portion protruding from the second flange portion toward the planar portion.

3. The grommet according to claim 2, wherein the second flange portion comprises a flange protrusion protruding more radially outward than the protruding portion.

4. The grommet according to claim 1, wherein the grommet further comprises:
    a grommet body, and
    a grommet inner member disposed inside of the grommet body,
    wherein the inner member includes an engaging portion configured to engage with the attachment hole.

* * * * *